United States Patent [19]

Hardwick

[11] 4,221,658
[45] Sep. 9, 1980

[54] EFFECTING LIQUID-LIQUID CONTACT

[75] Inventor: William E. Hardwick, Stockton-on-Tees, England

[73] Assignee: Davy International (Oil & Chemicals) Limited, England

[21] Appl. No.: 879,501

[22] Filed: Feb. 21, 1978

[30] Foreign Application Priority Data

Feb. 21, 1977 [GB] United Kingdom ............ 07224/77

[51] Int. Cl.² .......................................... B01D 11/00
[52] U.S. Cl. ................................ 210/634; 210/643; 210/DIG. 5; 422/259
[58] Field of Search ............... 210/21, 511, DIG. 5; 23/306; 422/256-259

[56] References Cited

U.S. PATENT DOCUMENTS

| 2,029,691 | 2/1936  | Robinson      | 210/21      |
| 2,077,057 | 4/1937  | Poole         | 210/21 X    |
| 2,218,080 | 10/1940 | Bottaro       | 210/511     |
| 2,405,158 | 8/1946  | Mensing       | 210/511 X   |
| 2,667,407 | 1/1954  | Fenske et al. | 210/21      |
| 2,735,755 | 2/1956  | Carney        | 23/310      |
| 2,850,362 | 9/1958  | Scheiber      | 23/267 MS   |
| 3,032,403 | 5/1962  | Kohl          | 23/267 MS   |
| 4,057,493 | 11/1977 | Davies        | 210/DIG. 5  |

FOREIGN PATENT DOCUMENTS

| 210774  | 5/1924  | United Kingdom | 210/511 |
| 791025  | 2/1958  | United Kingdom . |  |
| 1091554 | 11/1967 | United Kingdom . |  |
| 1314124 | 4/1973  | United Kingdom . |  |

OTHER PUBLICATIONS

"Design of Large Scale Mixer-Settlers," by J. B. Lott et al., SME Transactions, 252 (Mar. 1972).
"A New Concept in Solvent Extraction Technology," Davy Powergas Ltd. Bulletin No. 3-14675, 1976.

Primary Examiner—John Adee
Attorney, Agent, or Firm—Bernard & Brown

[57] ABSTRACT

An apparatus and method are disclosed for effecting liquid-liquid contact. An aqueous medium and an organic hydrophobic liquid medium are fed to a mixing chamber in which a "primary" dispersion, capable of disengaging sustantially completely into two separate layers on standing under gravity, is formed by suitable mixing means. Dispersion is allowed to flow upwardly and downwardly from the mixing chamber into upper and lower baffled zones positioned immediately above and below the mixing chamber respectively. Disengaged lighter medium is allowed to collect in an upper chamber above and communicating with the upper baffled zone, while disengaged heavier medium is allowed to collect in a lower chamber below and communicating with the lower baffled zone. Heavier medium is allowed to return to the mixing chamber from the upper baffled zone and lighter medium from the lower baffled zone. By removing the respective disengaged media from the upper and lower chambers at the same rates and in the same ratio as they are fed to the mixing chamber a favorable (e.g. 1:1) mixing ratio can be maintained in the mixing chamber despite a different (e.g. 5:1) volume feed ratio to the mixing chamber.

20 Claims, 9 Drawing Figures

EFFECTING LIQUID-LIQUID CONTACT

This invention relates to a process and apparatus for effecting liquid-liquid contact.

Liquid-liquid extraction, or solvent extraction as it is often called, is a widely practised technique both in the laboratory and on an industrial scale. Thus contaminants or desired products which are soluble in organic solvents can be extracted from an aqueous phase by intimately contacting the aqueous phase with a suitable water immiscible organic extractant, followed by phase separation. In a similar way acidic or basic constituents of organic solutions can be removed by washing with an alkaline or acidic aqueous solution as the case may be. Yet another application of the technique which is of industrial importance is the use of so-called liquid ion exchangers in the extraction and purification of metals from their ores.

An example of the use of such liquid ion exchangers is the use of hydroxy oxime-type liquid ion exchangers to extract the copper content of acidic or basic copper-containing leach liquors obtained by leaching ores or secondary sources, such as copper-containing scrap, waste or dust. Typical of liquid ion exchange materials of this type are the materials sold under the trade names "Lix 63" and "Lix 64N" by General Mills Chemicals Inc, 1812 W Grant Road, Tucson, Arizona 85703, United States of America. Copper can be recovered from the liquid ion exchanger by contact with a strongly acidic aqueous phase whereupon the copper transfers from the organic phase into the acidic aqueous phase and the resulting aqueous solution can then be electrolysed.

Anions such as molybdate or tungstate can also be recovered from aqueous solutions by contact with a suitable liquid ion exchanger, for example a kerosene solution of a quaternary ammonium salt or tertiary amine such as tricaprylmethylammonium chloride or tricaprylamine. In the production of phosphoric acid it is known to extract a solution containing phosphoric acid and $P_2O_5$ as well as ionic impurities, such as ferrous and ferric ions, with a ketone which is incompletely soluble in water. In this way the $P_2O_5$ is extracted into the organic phase and can later be recovered as phosphoric acid by mixing with water.

Other examples of liquid-liquid extraction are the recovery of uranium from so-called "phos acid" and from sulphuric acid leach liquors used to leach uranium-containing ores.

In such solvent extraction processes it is usual to mix the aqueous and organic phases intimately in a mixing chamber so as to promote liquid-liquid contact and to generate a high interfacial surface area so as to promote exchange of material between the phases. Such intimate mixing produces a liquid-liquid dispersion which, in conventional equipment, is led to a separate settling tank in which the phases are allowed to separate out under gravity and from which the separated phases are removed for disposal or further treatment. Normally a solvent extraction plant includes an "extraction" section, possibly a "scrub" section, then a "strip" section, and possibly also a "regeneration" section, each of which requires one or more mixer-settler units.

In the normal design of a gravity settler the dispersion is fed at one side or end of a settling tank of large surface area and the separated phases are removed at the other end or side by a liquid flow past suitably located weirs. Across substantially the whole area of the settling tank three layers generally develop; the upper and lower layers are formed by the coalesced phases while the middle layer, which is usually only a few inches in depth, e.g. 3 inches, is formed by dispersion. Attempts to reduce the plan area of gravity settlers for a given flow rate of dispersion result in a disproportionate increase in the depth of the dispersion band and accordingly lead quickly to the flooding of the settler with dispersion.

Proposals exist for tray or multi-level settlers but these require a separate offtake for each separated phase for each tray or level to avoid further admixture of separated phases and/or dispersion bands after passage of the liquids over the trays.

Forms of settler have also been proposed having closely spaced downwardly inclined plates in order to assist phase separation but without offtake provision for the layers between the plates.

The large size of conventional gravity settlers results in the necessity for a large volume of organic phase in the plant and a large hold up of the material being extracted in the settling tank, as well as of any transport agent used. It would be desirable to reduce the volume of organic phase, and hence reduce the fire hazard, and also to reduce the hold up of possibly valuable material in the settling tank.

One approach which has been adopted with some success is to use a droplet coalescence enhancing perforate packing disposed in the path of the dispersion. A typical material is a knitted mesh of two dissimilar materials, one wettable by the organic phase and one wettable by the aqueous phase, such as that sold under the trade mark "D C KnitMesh" by KnitMesh Limited of Greenfield, Holywell, Clwyd, which is a dual filament knitted mesh fabric knitted from side by side filaments of, for example, stainless steel and polypropylene. Such a material acts as an efficient dispersion breaker, whichever phase is the dispersed phase, coalescence of the dispersed phase being assisted by contact with large numbers of junctions between surfaces of considerably differing surface energy materials.

In our Belgian Pat. No. 828117 we have described a circular mixer-settler that has a plurality of segment-shaped settling chambers, each containing a packing such as "D C KnitMesh", and that occupies a much smaller area than conventional mixer-settler units.

It is an object of the invention to provide an apparatus which will enable efficient liquid-liquid contact to be effected with smaller organic inventories than is possible using conventional mixer-settlers.

It is a further object of the invention to provide an efficient method of effecting liquid-liquid contact involving the use of lesser amounts of possibly flammable organic materials than heretofore.

It is a still further object of the invention to provide an apparatus for effecting liquid-liquid contact with maintenance of a favourable volume ratio of the liquid media in the mixing zone, whatever the relative feed rates of the liquid media to the mixing zone over a wide range of operating conditions, without the necessity of maintaining an external recycle stream of one of the liquid media after coalescence from the settling zone to the mixing zone.

According to one aspect of the present invention a method of effecting liquid-liquid contact comprises feeding to a mixing chamber an aqueous liquid medium and an organic hydrophobic liquid medium, the aqueous liquid medium being capable of undergoing mass transfer with the organic hydrophobic liquid medium;

forming in the mixing chamber a dispersion consisting of globules of one liquid medium dispersed in the other, the globules being of a size such that the dispersion is capable of disengaging substantially completely into two separate layers upon standing under gravity;

retaining dispersion in the mixing chamber for a period of time sufficient to allow mass transfer to occur between the two liquid media;

permitting dispersion to flow from the mixing chamber into an upper baffled zone disposed above the mixing chamber and containing upper baffle means providing a plurality of flow paths therethrough for passage of liquid between the mixing chamber and an upper chamber disposed above the upper baffled zone;

permitting disengaged lighter medium to collect in the upper chamber;

maintaining settling conditions in the upper chamber to facilitate maintenance of a layer of disengaged lighter medium therein;

permitting heavier medium to flow back into the mixing chamber from the upper baffled zone;

permitting dispersion to flow from the mixing chamber into a lower baffled zone disposed below the mixing chamber and containing lower baffle means providing a plurality of flow paths therethrough for passage of liquid between the mixing chamber and a lower chamber disposed below the lower baffled zone;

permitting disengaged heavier medium to collect in the lower chamber;

maintaining settling conditions in the lower chamber to facilitate maintenance of a layer of disengaged heavier medium therein;

permitting lighter medium to flow back into the mixing chamber from the lower baffled zone;

continuously removing disengaged lighter medium from the upper chamber;

continuously removing disengaged heavier medium from the lower chamber; and recovering disengaged lighter and heavier media each at a rate substantially equal to the rate of feed thereof to the mixing chamber whereby a predetermined volume ratio of the liquid media is maintained in the mixing chamber independently of the ratio of the feed rates of the liquid media to the mixing chamber.

In the practice of the invention the instantaneous volume ratio in the mixing zone is selected to favour mixing of the media and formation of a dispersion of the required characteristics, to minimise entrainment and to maximise mass transfer efficiency. Preferably the instantaneous volume ratio in the mixing chamber lies the range of from about 5:1 to about 1:5, more preferably in the range of from about 2:1 to about 1:2, for example about 1:1.

In a preferred method according to the invention the step of recovering disengaged lighter and heavier media comprises permitting disengaged lighter medium to flow out of the upper chamber and providing a riser communicating with the lower chamber for removal of disengaged heavier medium and an overflow weir whose height in relation to the upper surface level of disengaged lighter medium determines the interface level between the liquid media under non-mixing flow conditions in the mixing chamber and hence the instantaneous volume ratio of the media in the mixing zone.

The method of effecting liquid-liquid contact is applicable to any liquid-liquid extraction process and to any of the "extraction", "scrub", "strip" and "regeneration" stages, of such a process. Usually the aqueous and organic hydrophobic media each comprise a single liquid phase. However one of the media or both media may contain suspended solid matter therein or may contain another liquid phase dispersed in "secondary" dispersion-sized droplets or emulsified therein.

When a first liquid medium is dispersed in a second liquid medium in which it is substantially insoluble, there may be formed a primary dispersion, a secondary dispersion or an emulsion. A primary dispersion will disengage on standing under gravity and the globule size of the dispersed medium is generally of the order of 100 microns ($\mu$m) or more. A secondary dispersion, on the other hand, will not usually disengage solely on standing under gravity and the globules of dispersed liquid medium are generally considerably smaller than 100 microns ($\mu$m) in diameter, e.g. of the order of 20 microns ($\mu$m) or less in diameter. However, secondary dispersions still have larger globule sizes than true emulsions formed with the aid of an emulsifying agent which have dispersed phase droplets less than 1 micron ($\mu$m) in diameter. Primary dispersions are commonly formed at appropriate shear rates of mixing when in instantaneous volume ratio of the liquid media in the mixing zone ranges from about 1:5 to about 5:1. Secondary dispersion-sized globules of dispersed medium can be formed if too high a shear rate of mixing is used, particularly if the phases are present in the mixing zone in a disproportionate ratio, e.g. less than about 1:10 by volume or more than about 10:1 by volume. In the practice of the present invention mixing is effected at a shear rate such that essentially all of the globules of dispersion are of the size of a primary dispersion, with essentially none of the size of a secondary dispersion.

Although the instantaneous volume ratio of the liquid media in the mixing zone may be about 1:1 the media may flow into the mixing chamber at different rates. It is preferred to operate the method of the invention such that in the dispersion the dispersed medium is the one that is supplied at the lower feed rate, whilst the continuous medium of the dispersion is the one supplied at the higher rate to the mixing chamber.

When a dispersion disengages the globules of the dispersed medium undergo "drop-to-drop" coalescence and/or "drop-to-bulk medium" coalescence, while the continuous medium runs together to form a settled out layer of the corresponding bulk medium. It is convenient to refer both to the settled out continuous medium and also to the coalesced dispersed medium as a disengaged medium in each case.

The residence time in the mixing chamber may range within wide limits, for example from about 10 seconds or less up to about 90 minutes or more. However it will usually lie in the range of from about 15 seconds to about 15 minutes.

The ratio of the feed rates of the media to the mixing chamber may similarly range within wide limits. For example the aqueous medium:organic medium feed rate ratio may be from about 100:1 to 1:100, more usually in the range from about 40:1 to 1:40, e.g. from about 10:1 to 1:10, by volume.

According to another aspect of the present invention apparatus for effecting liquid-liquid contact comprises:
a mixing chamber;

supply means for supplying to the mixing chamber an aqueous liquid medium and an organic hydrophobic liquid medium, the aqueous liquid medium being capable of undergoing mass transfer with the organic medium;

mixing means in the mixing chamber for mixing the aqueous and organic hydrophobic liquid media so as to form a dispersion of globules of one phase dispersed in the other, the globules being of a size such that the dispersion is capable of disengaging substantially completely into two separate layers upon standing under gravity;

an upper chamber disposed above the mixing chamber;

upper baffle means disposed between the mixing chamber and the upper chamber and providing a plurality of flow paths for passage of liquid between the mixing chamber and the upper chamber in operation of the apparatus, the upper baffle means further being adapted to permit maintenance in the upper chamber of settling conditions facilitating collection of, and maintenance of a layer of, disengaged lighter medium in the upper chamber, despite turbulent mixing conditions in the mixing chamber;

a lower chamber disposed below the mixing chamber;

lower baffle means disposed between the mixing chamber and the lower chamber and providing a plurality of flow paths for passage of liquid between the mixing chamber and the lower chamber in operation of the apparatus, the lower baffle means further being adapted to permit maintenance in the lower chamber of settling conditions facilitating collection of, and maintenance of a layer of, disengaged heavier medium in the lower chamber, despite turbulent mixing conditions in the mixing chamber;

means for continuously recovering disengaged lighter medium from the upper chamber at a rate corresponding substantially to the rate of supply of the lighter medium to the mixing chamber; and means for continuously recovering disengaged heavier medium from the lower chamber at a rate corresponding substantially to the rate of supply of the heavier medium to the mixing chamber, whereby a predetermined volume ratio of the media can be maintained in the mixing chamber independently of the feed ratio of the media to the mixing chamber.

The agitator means may be of any desired type but conveniently comprises one or more impellers which is or are desirably mounted for rotation about the vertical axis of the mixing chamber. Such impellers may be, for example, of the pump-mix type, of the marine impeller type, or of the turbine type. Such impellers produce a fairly well defined region of influence when operating in a large body of liquid. Within this region of influence good mixing and good dispersion are achieved. Beyond this region of influence the impeller has relatively little mixing effect. The shape of the region of influence is determined in part by the walls of the vessel, if the volume of the vessel is comparable to that of the region of influence. Where the vessel is smaller than the region of influence then it is possible essentially entirely to fill the vessel with dispersion.

In the practice of the present invention it is preferred to design the mixing chamber in relation to the agitator means such that the region of influence of the impeller extends at least as far as the side walls and preferably also to the upper and lower baffle means.

The mixing chamber may be of any suitable shape, e.g. square in plan, but conveniently is cylindrical in shape, preferably arranged with its axis vertical. The height:width (diameter) ratio should be suitable for the type of impeller used. For example, when using a double-shrouded pump-mix impeller and a draught tube the mixing chamber may be cylindrical with a height:diameter ratio of, for example, from about 0.2:1 to about 0.8:1.

At least one of the upper and lower baffle means may comprise a horizontal perforated plate or a plurality of superposed spaced horizontal perforated plates, preferably with the perforations in adjacent plates offset one from another. Alternatively it may comprise a plurality of baffle plates. It is desirable that the baffle plates should be arranged in an array and that adjacent plates should be parallel (or approximately parallel). The baffle plates may be vertical or they may be inclined to the horizontal. Suitable angles of inclination lie in the range of from about 30° to about 60° to the horizontal, up to about 80° or more to the horizontal, e.g. about 45° to the horizontal. Under favourable circumstances coalescence of dispersion may be wholly completed in one or both of the upper and lower baffle means. Alternatively dispersion may pass through one or both of the upper and lower baffle means so that at least some disengagement occurs in the corresponding upper or lower chamber. In all cases, however, the upper and lower baffle means act to prevent the turbulence in the mixing chamber affecting the settling conditions needed in the respective upper and lower chambers.

In designing a plant in which disengagement is to occur in the baffled zones, the vertical spacing between adjacent inclined baffle plates is preferably chosen to be slightly greater than the depth of dispersion band in a conventional gravity settler required to give the desired coalescence rate. Thus the vertical spacing between adjacent plates may range from about one inch or less up to ten inches or more but preferably lies in the range of about 2 to about 5 inches, e.g. about 3 inches. Where the mixing chamber is cylindrical the plates of the baffle means are conveniently formed into an annular packing zone around the axis of the mixing chamber. To assist in disengagement of the dispersion into separate layers opposite faces of each of the baffle plates may be made from materials of different surface energy characteristics. Thus one face of each plate may be made form a high surface energy material such as stainless steel, whilst the other face is made from a low surface energy material such as polypropylene, the faces of high and low surface energy characteristics alternating in the baffle means. The plates may be corrugated with the corrugations preferably lying in the direction of maximum slope. Preferably the peaks of the corrugations of adjacent plates lie in the same vertical plane so that the vertical distance between adjacent plates remains constant at a desired value.

In one preferred embodiment at least one of the upper and lower perforate baffle means comprises a plurality of vertical baffle plates whose planes intersect to form an array of open-ended cells of a suitable size and shape to provide the plurality of liquid flow paths. Thus the vertical baffle plates may be arranged in two sets of parallel plates, with the planes of the two sets substantially at right angles one to another so as to form open-ended square section cells.

In many cases the choice of material of construction of the upper and lower baffle means is not critical.

However, depending on the chosen instantaneous volume ratio in the mixing zone and/or on the volume flow rate ratio of the liquid media to the mixing chamber, it may be desirable, in some cases, in order to assist the internal recycle of the disengaged media to the mixing chamber that occurs in the practice of the present invention, to make one of the baffle means of one material, e.g. a material that is wettable by the dispersed medium, and the other baffle means of a different material, e.g. one that is wettable by the continuous medium. Yet again, it may be desirable in other circumstances, to make both baffle means of the same material. Furthermore, other circumstances may favor the use of a combination of materials in the construction of one or both baffle means, one material being wettable by the continuous medium and the other by the dispersed medium.

Alternatively the upper and/or lower baffle means may comprise a pad of a mesh fabric, which may be a woven or knitted fabric, arranged in one or more layers. Such a fabric may be formed of a material that is wettable by one of the liquid media only, e.g. stainless steel or polypropylene. Preferably, however, the fabric is formed from a mixture of two materials one of which is wettable by one of the liquid media and the other of which is wettable by the other medium. A suitable fabric is that sold under the trade name "D C KnitMesh", that is to say a dual filament knitted mesh fabric knitted from side by side filaments of a high surface energy material and of a lw surface energy material. A typical fabric of this type is a dual filament knitted mesh fabric knitted from side by side filaments of stainless steel and polypropylene.

The upper or lower baffle means may each comprise a combination of two or more of the above-mentioned bafflemeans, e.g. a perforated plate in combination with a pad of "D C KnitMesh" fabric.

In all cases the upper and lower baffle means must be designed so as to provide settling conditions conducive to collection of, and maintenance of, the respective disengaged medium in the upper and lower chambers, despite the mixing conditions in the mixing chamber. Such conditions will also be conducive to dispersion coalescence in the respective upper or lower chamber. Additionally the flow paths through the baffle means must be sufficiently large and/or numerous not to choke the return flows of the two media to the mixing chamber from the respective baffle means. Ideally the baffle means should be designed to ensure that liquid enters and leaves the upper and lower chambers with a gross flow that is substantially vertical, even though the rotation of the impeller imparts a swirling movement to the dispersion in the mixing chamber. Such vertical movement may disturb any dispersion-bulk medium interface in the respective upper or lower chamber but not sufficiently to cause re-dispersion.

The upper and lower chambers are bounded at one side by the respective baffle means and have outlet pipes or weir arrangements for the respective disengaged liquid medium.

The means for removing disengaged liquid media may comprise means for selectively controlling the withdrawal rates of disengaged liquid media, for example valves or the like in outlet pipes from the upper and lower chambers for the respective disengaged media. In an alternative arrangement the means for continuously recovering disengaged lighter medium from the upper chamber comprises an overflow device whereby the upper surface level of disengaged lighter medium remains at a substantially constant height in the apparatus and the means for continuously recovering disengaged heavier medium from the lower chamber comprises a riser communicating with the lower chamber and a weir, which may be adjustable, over which disengaged heavier medium from the riser may overflow in operation of the apparatus, the height of the weir in relation to the upper surface level of the disengaged lighter medium serving to determine the height of the interface between the media in the mixing chamber under non-mixing flow conditions and hence the volume ratio of the media in the mixing zone in operation of the apparatus.

The liquid media may be introduced into the mixing chamber in any convenient manner. In one arrangement an organic hydrophobic medium is led in through a draught tube axially of a cylindrical mixing chamber whilst an aqueous phase is introduced tangentially. Both media may be introduced through an axial draught tube in yet another arrangement.

In order that the invention may be clearly understood and readily carried into effect some preferred embodiments thereof will now be described, by way of example only, with reference to the accompanying drawings, wherein.

Figure 1:
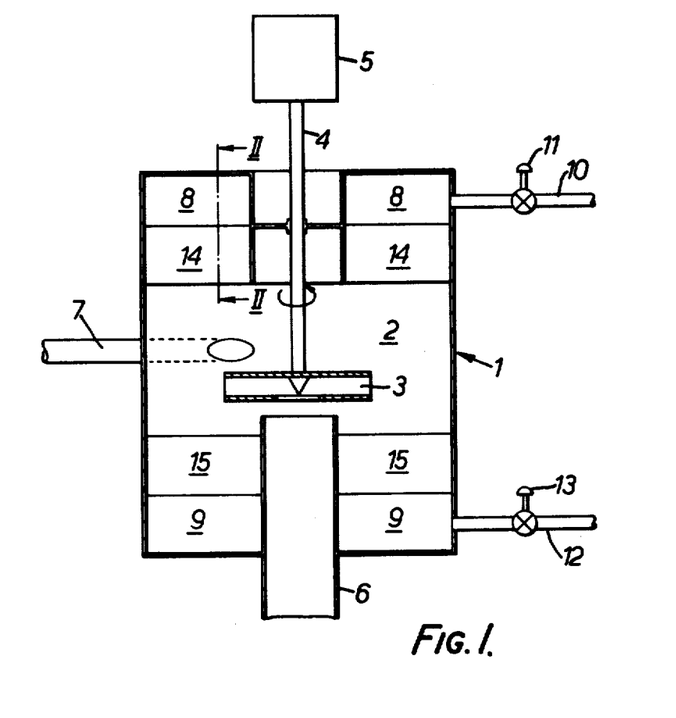
FIG. 1 shows a diagrammatic vertical section through a form of liquid-liquid extraction apparatus constructed in accordance with the invention.

Referring to the accompanying drawings, and in particular to FIG. 1 thereof, a liquid-liquid extraction apparatus or mixer-settler unit 1 has a cylindrical mixing chamber 2 whose axis is vertically arranged and has a height to diameter ratio of about 0.8. An impeller 3 is mounted in mixing chamber 2 on a shaft 4 which is rotatable by means of a motor 5 mounted on top of the unit. An organic phase which is lighter than water can be supplied to the "eye" of impeller 3 through draught tube 6. A tangentially opening pipe 7 is provided for introducing an aqueous phase into the mixing chamber.

Above and below mixing chamber 2 are annular chambers 8 and 9 for receipt of disengaged organic and aqueous phases respectively. Chamber 8 is provided with an outfllow pipe 10 having a valve 11 therein for selectively controlling the rate of withdrawal of organic phase, whilst chamber 9 is connected to an outlet pipe 12 for disengaged aqueous phase. The rate of withdrawal of disengaged aqueous phase can be selectively controlled by means of a valve 13 provided in pipe 12.

Between mixing chamber 2 and chamber 8 there is an annular array of corrugated plates 14 each extending essentially radially and inclined at an angle of 45° to the horizontal. For the sake of simplicity of the drawing the corrugations, which run in the direction of maximum slope, are not shown. These corrugations are arranged so that crests of corresponding corrugations of adjacent plates lie in the same vertical plane. A similar annular array of inclined plates 15 separates chamber 9 from mixing chamber 2. These arrays of plates 14 and 15 provide a plurality of inclined narrow passages for the liquid-liquid dispersion leading from the mixing chamber to the respective one of the chambers 8 and 9.

Figure 2:
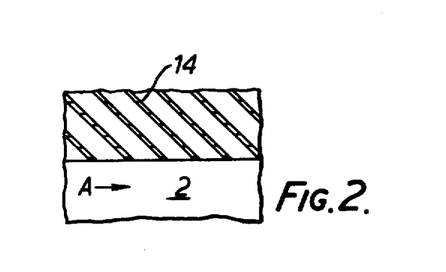
FIG. 2 is a section to an enlarged scale on the line II—II of FIG. 1.

The impeller 3 causes an overall rotation of the body of liquid in the mixing chamber 2 past the exposed ends of the inclined plates 14 and 15. As can be seen from FIG. 2 the passages between the plates 14 are so inclined in relation to the overall direction of rotation A of the body of the liquid in chamber 2 that dispersion enters the passages between the plates 14 at low velocity and in particular with little or no rotational component of velocity around the axis of the mixing chamber 2. The plates 15 are similarly arranged. In this way disengagement of the phases in the passages is disturbed as little as possible by conditions in the mixing chamber. Disengagement of the dispersed phase occurs in each of the passages and the disengaged phases form liquid films over the opposed faces of the plates defining the passage, the lighter phase running up the upper of the opposed faces and the heavier phase running down the lower of the opposed faces.

It is desirable in operation of a mixer-settler to operate the mixer with a predetermined volume ratio of phases, e.g. an approximately 1:1 organic phase:aqueous phase ratio by volume in the mixer. In many applications where concentration of a component is desired, as in the extraction of uranium values from a dilute leach liquor, the volume of one phase (e.g. the leach liquor) may greatly exceed that of the other phase (e.g. the liquid ion exchange material). In order to obtain the desired approximately 1:1 volume ratio in the mixer it is necessary to recycle the separated organic phase to the mixer from the downstream end of the settler tank by an external recycle loop. The illustrated apparatus provides an automatic internal recycle to the mixing zone so that by control of the takeoff rates of the disengaged phases the desired 1:1 volume ratio of phases may be maintained in the mixing chamber at all times without the necessity for external recycle of one phase. Hence even if the feed ratio by volume of the phases to the mixing chamber varies within a wide range, e.g. from about 50:1 to about 1:50, yet still the desirable 1:1 volume ratio of phases can be maintained in the mixing chamber.

For certain applications the arrays of inclined plates 14 and 15 can be replaced by annular pads of "D C KnitMesh" or by other forms of baffle.

Where the organic phase is heavier than the aqueous phase the impeller can be located so that the organic phase is introduced from above.

If desired the aqueous phase can be introduced through draught tube 6 and the organic phase via pipe 7.

Figure 3:
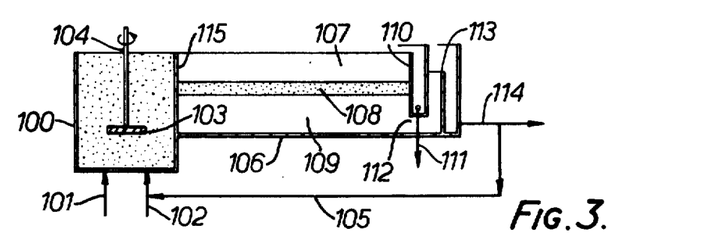
FIG. 3 shows a diagrammatic vertical section through a conventional form of liquid-liquid extraction apparatus.

Referring to FIG. 3, a mixer-settler for a copper "strip" stage comprises a mixer box 100 provided with an inlet line 101 for a copper-loaded organic medium (such as a conventional hydrocarbon-based copper extractant, e.g. "Lix 64N" dissolved in kerosene) and an inlet line 102 for an aqueous acidic medium, e.g. 1.5M $H_2SO_4$. An impeller 103 mounted on vertical shaft 104 serves to form a liquid-liquid dispersion having substantially entirely "primary dispersion"-sized globules of the dispersed phase. The organic medium:aqueous medium feed ratio through the lines 101 and 102 is 5:1 by volume. In order to maintain a favourable 1:1 volume ratio in mixer box 100, disengaged aqueous medium is recycled via recycle line 105 and admixed with fresh aqueous medium in line 102. After residence in mixer box 100 for a period of time sufficient to permit mass transfer to occur (usually, for example, in the range of from about 1 to about 5 minutes, for example about 2 minutes, dispersion passes from mixer box 100 via a suitable conventional overflow arrangement (not shown) into settler compartment 106. Three bands form in settler compartment 106, namely an upper layer 107 of disengaged organic medium, a middle layer 108 of dispersion and a lower layer 109 of disengaged aqueous phase. Disengaged organic phase overflows weir 110 and is removed via line 111 while disengaged aqueous phase passes through underflow passage 112 to overflow weir 113. Disengaged aqueous phase is removed via line 114 from which the recycle flow is withdrawn via recycle line 105 for return to mixer box 100.

In operation of the apparatus of FIG. 3 at an organic medium:aqueous medium feed ratio of 5:1 by volume it is desirable to maintain the volume ratio of the organic and aqueous media in the mixer box 100 at a value which favours the mass transfer rate. Typically such volume rato lies in the range of from about 2:1 to about 1:2, for example about 1:1. Not only does such a volume ratio favourably increase the rate of mass transfer but also it facilitates the formation of a "primary dispersion" and minimises entrainment.

In order to maintain a volume ratio of about 1:1 a mixer box 100 it is necessary to recycle 4 volumes of disengaged aqueous medium via line 105 for every 5 volumes of organic medium fed via line 101 and for every 1 volume of aqueous medium fed via line 102.

In operation of the apparatus of FIG. 3, it is found that a 1:1 by volume dispersion can be fed at a rate up to the design rate of the settler compartment 106 and that under such conditions the disengagement of the dispersion proceeds smoothly under the influence of gravity. If, however, the dispersion feed rate exceeds the design rate it is found that the depth of the dispersion band 108 tends to increase and finally may entirely fill settler compartment 106 so that what emerges via lines 111 and 114 is still dispersion and not the respective disengaged media. Hence the settling area of settler compartment 106 (i.e. the plan area of band 108) must be sufficient to accommodate the flow of dispersion. Moreover, it will be noted that, because of the recycle flow via line 105, for every 1 volume of aqueous phase fed via line 102, 10 volumes of dispersion must settle out in settler 106. This means that the settling area must be large enough to accommodate this dispersion flow rate. Also, this means that the volume of liquids in the settling compartment must be correspondingly high, resulting in high inventories of organic medium and hold-up of possibly valuable extractant and/or extracted materal in the apparatus.

Figure 4:
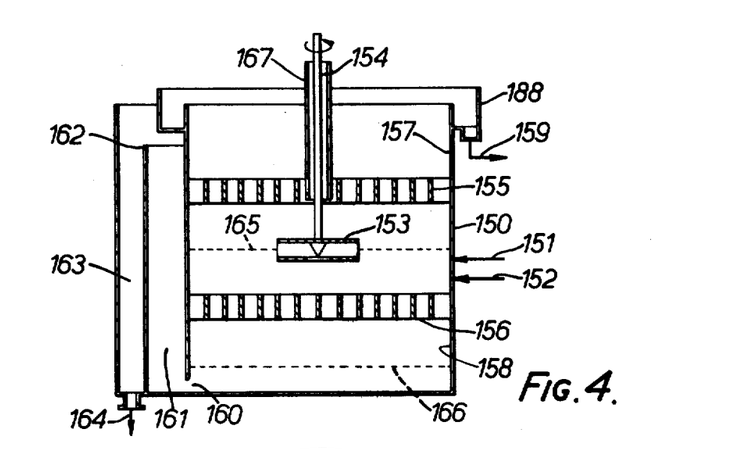
FIG. 4 shows a diagrammatic vertical section through a further form of liquid-liquid extraction apparatus constructed in accordance with the invention.
Figure 5:
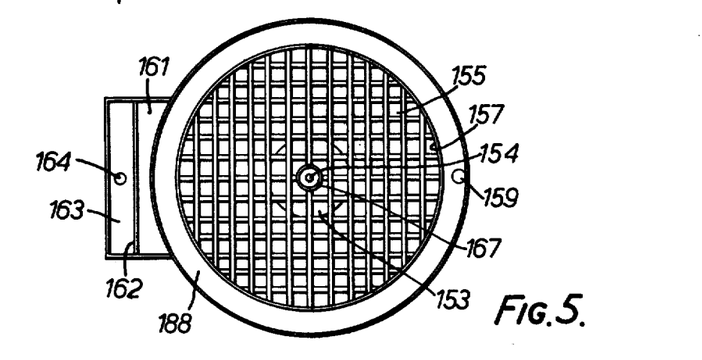
FIG. 5 is a cross-section to a slightly reduced scale through the apparatus of FIG. 4 on the line V—V.
Figure 6:
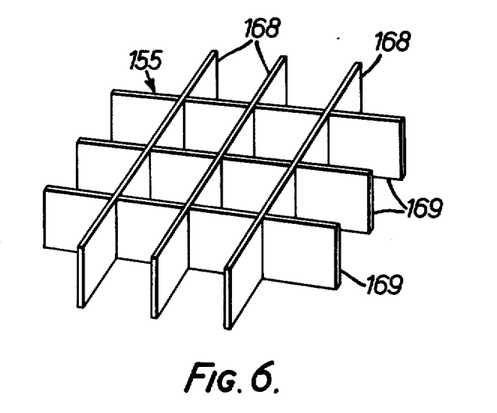
FIG. 6 shows in perspective a portion of one of the baffles used in the apparatus of FIGS. 4 and 5.

In the apparatus of FIGS. 4 to 6, organic medium is fed to a mixing chamber 150 via line 151 whilst aqueous medium is fed via line 152. The feed liquors are the same as in FIG. 3. The organic medium:aqueous medium feed ratio is 5:1 by volume, as in the case of the apparatus of FIG. 3. A double-shrouded impeller 153 having a blade depth:diameter ratio of 1:7 is mounted on a vertical axial shaft 154 for rotation by means of a suitable motor (not shown). A pair of "egg-box" baffles 155 and 156 are mounted one above and one below the mixing chamber 150. These provide a plurality of flow paths for liquid between the mixing chamber and upper and lower chambers 157 and 158. The construction of baffle 155 is shown in more detail in detail in FIG. 6; baffle 156 is similar. Besides providing a boundary between mixing chamber 150 and a respective one of upper and lower chambers 157 and 158, baffles 155 and 156 serve to ensure that any liquid passing through to the respective upper or lower chamber 157 or 158, as the case may be, enters it essentially without any rotational component of motion about the axis of shaft 154 so that settling conditions conductive to dispersion coalescence are maintained in the respective upper or lower chamber. Thus the depth of baffles 155 and 156 and the spacing between adjacent plates of the baffle must be selected accordingly.

An annular channel 188 surrounds the upper end of upper chamber 157 into which disengaged organic medium overflows for removal via outlet 159. Coalesced aqueous medium, on the other hand, flows out of lower chamber 158 via underflow passage 160 into riser 161 and then over weir 162 into chamber 163 for removal via line 164.

The height of the upper edge of weir 162 in relation to the upper edge of chamber 157 will determine the interface level between the media in the mixing chamber under non-mixing flow conditions (i.e. with the impeller stationary but with the media being supplied via lines 151 and 152). This interface level is indicated at 165 in FIG. 4. The height of this interface level in the mixing chamber determines also the volume ratio of the media in the mixing chamber under mixing conditions. Desirably the interface level 165 is set to provide a predetermined volume ratio between the media in the mixing chamber of between about 5:1 and 1:5, more particularly in the range of from about 2:1 to 1:2, e.g. about 1:1. Weir 162 can be adjustable in height to permit adjustment of interface level 165.

In the practice of the present invention it is desirable that the dispersed medium should be the one that is fed at the lower rate to the mixing chamber 150 for reasons that will appear below, i.e. the dispersion should be of water-in-oil type. (If the aqueous medium were to be fed at a higher rate, therefore, than the organic medium, e.g. at a 10:1 aqueous medium:organic medium feed ratio by volume, then the apparatus should desirably be operated under aqueus-continuous conditions, i.e. with an oil-in-water type dispersion).

In operation of the apparatus of FIGS. 4 to 6, a "primary dispersion" of the water-in-oil type is formed. This flows out of mixing chamber 150 and into the baffled zones formed by baffles 155 and 156. Either partial or complete phase disengagement may occur in these zones. Dispersion may further flow on into upper and lower chambers 157 and 158 where the settling conditions facilitate coalescence. Disengaged organic medium collects above any dispersion in upper chamber 157 and coalesced aqueous medium collects below any dispersion in lower chamber 158. Aqueous medium runs back from the upper baffled zone into mixing chamber 150 and organic medium flows back from the lower baffled zone into mixing chamber 150. The illustrated weir arrangements allow the disengaged media to be removed from the apparatus substantially at the same rate and in the same ratio that they are supplied via lines 151 and 152, whilst maintaining the predetermined volume ratio, e.g. about 1:1, in the mixing chamber 150.

Since the media are supplied at an organic medium: aqueous medium volume rato of 5:1 and since the dispersion is about 1:1 by volume, for every 5 volumes of organic medium supplied via line 151, 10 volumes of dispersion flow up into the upper baffled zone 155 whilst 1 volume of aqueous medium is supplied via line 152 and 2 volumes of dispersion pass into lower baffled zone 156. Of the 10 volumes of dispersion passing into the upper zone 155, 5 volumes of the lighter organic medium settle out whilst 5 volumes of aqueous medium, either wholly or partially coalesced, return into mixing chamber 150. It is not essential that the dispersed aqueous medium should coalesce completely before running back from baffled zone 155 into mixing chamber 150. Hence the aqueous medium may return to the mixing chamber 150 from baffled zone 155 still in droplet form, albeit as somewhat enlarged droplets. Of the 2 volumes of dispersion flowing into lower baffled zone 156, 1 volume of aqueous medium is coalesced completely and flows out via passage 160 whilst 1 volume of organic medium flows back into mixing chamber 150.

It will be appreciated that, although lower chamber 158 must be dimensioned to provide sufficient settling area for the design flow rate of dispersion to disengage completely, such settling area need only be about one fifth that of the settler compartment of FIG. 3. Furthermore, it is not necessary that the upper baffled zone 155 and upper chamber 157 provide sufficient settling area for complete disengagement of the dispersed aqueous medium. In designing apparatus according to the invention for particular design flow rates, the area of a section 166 above the underflow passage 160 must be as large as, or larger than, the minumum settling area for the expected downward flow rate of dispersion through baffled zone 156.

Since complete coalescence of the dispersed medium of dispersion passing upwardly into baffled zone 155 is not necessary, it will often be found that the combined (plan) settling areas required above and below the mixing chamber 150 are less, usually considerably less than for a conventional mixer-settler operating at the same design feed rates, hence reducing the overall settler size and reducing inventories. If necessary chamber 158 may flare outwardly and downwardly in conical fashion from baffle 156 to provide the necessary settling area below mixing chamber 150. Similarly upper chamber 157 can be flared outwardly and upwardly from the upper baffle 155 to provide a sufficient settling area above mixing chamber 150 to ensure that a disengaged layer of organic medium can be formed on top of any dispersion in upper chamber 157 to prevent overflow of dispersion into annular channel 188.

In effect the apparatus of the present invention incorporates an automatic internal recycle of that medium which is supplied at the lower feed rate to the mixing chamber (in the example described, the aqueous medium), which will usually be the dispersed phase. Besides requiring a smaller settling area than conventional apparatus (and hence potentially lower inventories of solvent and extractant and other chemicals and potentially less hold up of valuable materials in the apparatus), there is no need for an external recycle loop and the possible need for a recycle pump and its associated running costs are also eliminated.

Mixing chamber 150 is designed to be filled with dispersion in operation of the impeller and is dimensioned to provide the desired residence time of the liquid media therein, usually in the range of from about 1 to about 5 minutes, e.g. about 2 minutes, in order for the desired mass transfer to occur between the media.

Although impeller 153 has been shown as a double-shrouded impeller, other types can be used if desired, e.g. a marine impeller or turbine impeller.

Reference numeral 167 indicates a shroud tube surrounding shaft 154 to prevent agitation of the contents of upper chamber 157.

As can be seen from FIG. 6, baffle 155 comprises two sets of parallel plates 168 and 169 which intersect at right angles. Only a small part of baffle 155 is shown. Baffle 156 is similar. The spacing between adjacent parallel plates should be sufficiently small in relation to the depth of the baffle 155 or 156 to prevent any substantial swirling motion from mixing chamber 150 being imparted to the liquid in upper and lower chamber 157 or 158 but not so small as to cause "choking" problems in the flow of wholly or partially disengaged medium back to, and dispersion out of, mixing chamber 150.

Figure 7:
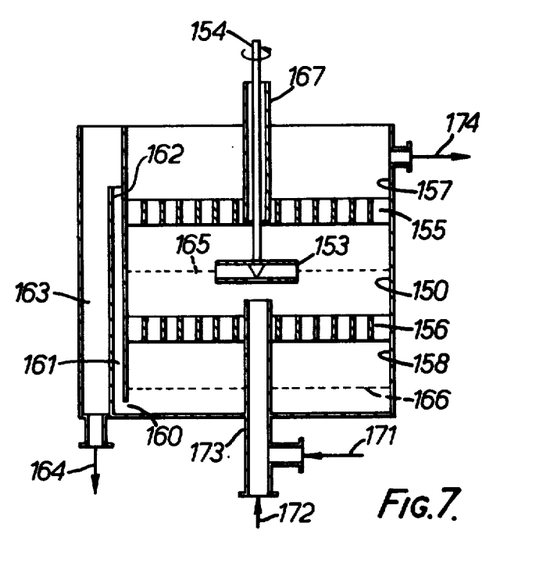
FIG. 7 shows a diagrammatic vertical section, similar to that of FIG. 4, through a further form of liquid-liquid extraction apparatus constructed in accordance with the invention.

FIG. 7 illustrates an alternative embodiment of the apparatus of the invention in which like parts to those in the embodiment of FIGS. 4 to 6 are given like reference numerals. In this embodiment inlet lines 151 and 152 are replaced by lines 171 and 172 respectively, connected to draught tube 173 positioned beneath the "eye" of impeller 153. Also annular channel 188 is omitted and line 159 is replaced by line 174. If desired a premixing chamber (not shown) fitted with an appropriate impeller (possibly also mounted on shaft 154) can be provided between the union of the lines 171 and 172 and mixing chamber 150 in order to form a dispersion from the media (albeit not at the desired 1:1 by volume ratio) of the correct continuity, i.e. in the example under consideration where the organic medium: aqueous medium feed rate ratio is 5:1, a water-in-oil type dispersion, prior to entry to mixing chamber 150.

If desired the "egg-box" baffles 155 and 156 can be replaced by pads of "D C KnitMesh", possibly supplemented by horizontal perforated plates in the boundaries between mixing chamber 150 and baffles 155 and 156.

Instead of square section-celled "egg-box" baffles, baffles 155 and 156 can alternatively be constructed with, for example, hexagonal section-celled "egg-box" baffles.

Figure 8:
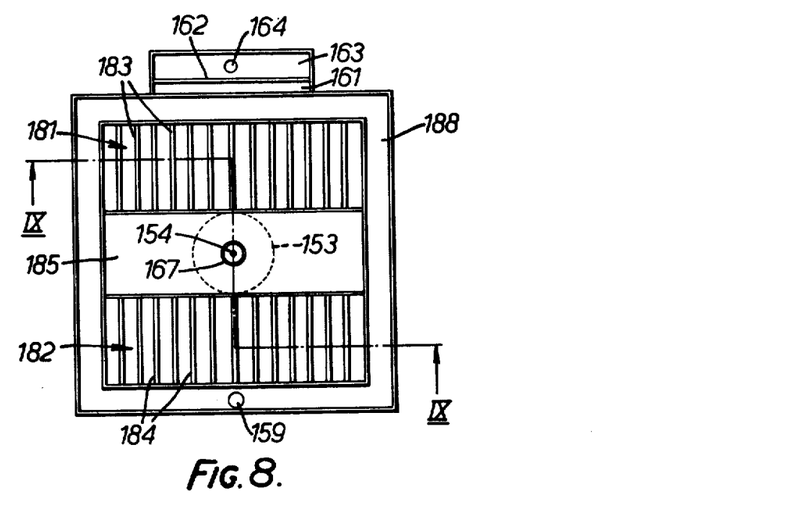
FIG. 8 shows a plan view of a further embodiment of the invention.
Figure 9:
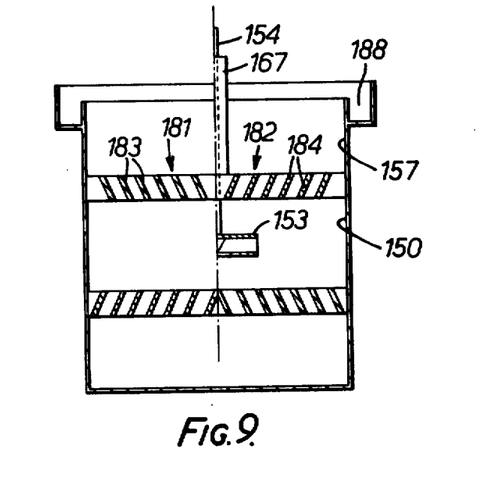
FIG. 9 is a vertical section through the upper baffle means of the apparatus of FIG. 8.

FIG. 8 shows a plan view of a further embodiment of the invention somewhat similar to the embodiments of FIGS. 4 to 6 and of FIG. 7. Again, like parts are given like reference numerals. In this case mixing chamber 150 is square in plan and each of baffles 155 and 156 is replaced by a pair of baffle members 181 and 182, each comprising a plurality of inclined plates 183 and 184. As can be seen from FIG. 9 the direction of inclination of the plates 183 differs from that of the plates 184. The method of operation is similar to the embodiment of FIGS. 4 to 6. Reference numeral 185 indicates a blanked off area.

Although the invention has been particularly described in relation to a solvent extraction process utilising a 5:1 organic medium:aqueous medium feed rate ratio, it will be appreciated by the skilled reader that the invention can also be practised with other feed ratios and in relation to systems in which the aqueous medium is fed at a higher feed rate than the organic medium, so that the dispersion is preferably of the oil-in-water type. In this latter case the coalescence of droplets of dispersed organic medium in dispersion passing into the upper baffled zone must be complete, whereas complete disengagement of dispersion flowing into the lower baffled zone is not essential and organic medium can return to the mixing chamber still in droplet form, even if such droplets are somewhat enlarged.

It will be appreciated by those skilled in the art that the aqueous medium may be the lighter medium or the heavier medium depending on the composition of the organic medium. For example, if the organic medium is a hydrocarbon based copper extractant such as "Lix 64N" dissolved in a usual hydrocarbon solvent, then the organic medium will be lighter than the aqueous phase. However, if an organic solvent such as chloroform, having a higher specific gravity than water, is substituted for the hydrocarbon solvent, then the aqueous medium will be the lighter one.

In order to ensure that a dispersion of the correct continuity is formed in the forms of apparatus illustrated in FIGS. 4 to 9, it may be necessary to adjust the volume ratio in the mixing chamber 150 at start up in any suitable manner so that the desired continuous medium is initially in excess. One procedure involves interruption of the flow of the medium that is to be dispersed and drainage or siphoning of a sufficient amount of that medium out of the apparatus to shift interface level 165 temporarily to give the desired start up volume ratio in the mixing chamber. The flow of both media is then restored and the impeller started, whereupon the correct dispersion type is formed. As the impeller continues to run, the volume ratio of the media in the mixing chamber gradually automatically adjusts itself to the desired predetermined volume ratio.

What is claimed is:

1. A method of effecting liquid-liquid contact between an aqueous liquid medium and an organic hydrophobic liquid medium, the aqueous liquid medium being capable of undergoing mass transfer with the organic hydrophobic liquid medium and the liquid-liquid contact being effected at a selected volume ratio in the range of from about 5:1 to about 1:5 which may be the same as or different from the ratio of the feed rates of the media, which method comprises:

providing a mixing zone in a mixing chamber, which mixing zone contains the aqueous liquid medium and the organic hydrohobic liquid medium;

feeding to the mixing chamber further aqueous liquid medium and further organic hydrophobic liquid medium;

agitating the liquid medium in the mixing zone so as to form therein a dispersion consisting of globules of one liquid medium dispersed in the other, the globules being of a size such that the dispersion is capable of disengaging substantially completely into two separate layers upon standing under gravity; and the volume ratio of the liquid media in the dispersion lying in the range of from about 5:1 to about 1:5 and corresponding substantially to the instanteous volume ratio of the media in the mixing zone;

retaining dispersion in the mixing chamber for a period of time sufficient to allow mass transfer to occur between the two liquid media;

permitting dispersion to flow from the mixing chamber into an upper baffled zone disposed above the mixing chamber and containing upper baffle means providing a plurality of flow paths therethrough for passage of liquid between the mixing chamber and an upper chamber disposed above the upper baffled zone;

permitting disengaged lighter medium to collect in the upper chamber;

maintaining settling conditions in the upper chamber to facilitate maintenance of a layer of disengaged lighter medium therein;

permitting heavier medium to flow back into the mixing chamber from the upper baffled zone;

permitting dispersion to flow from the mixing chamber into a lower baffled zone disposed below the mixing chamber and containing lower baffle means providing a plurality of flow paths therethrough for passage of liquid between the mixing chamber and a lower chamber disposed below the lower baffled zone;

permitting disengaged heavier medium to collect in the lower chamber;

maintaining settling conditions in the lower chamber to facilitate maintenance of a layer of disengaged heavier medium therein;

permitting lighter medium to flow back into the mixing chamber from the lower baffled zone;

continuously removing disengaged lighter medium from the upper chamber;

continuously removing disengaged heavier medium from the lower chamber; and recovering disengaged lighter and heavier media each at a rate substantially equal to the rate of feed thereof to the mixing chamber to maintain the instantaneous volume ratio of the liquid media in the dispersion in the mixing zone substantially constant at a value in the range of from about 5:1 to about 1:5 which is independent of the ratio of the feed rates of the liquid media to the mixing chamber.

2. A method according to claim 1, in which the instantaneous volume ratio in the mixing zone lies in the range of from about 2:1 to 1:2.

3. A method according to claim 1, in which the step of recovering disengaged lighter and heavier media comprises permitting disengaged lighter medium to flow out of the upper chamber and providing a riser communicating with the lower chamber for removal of disengaged heavier medium and an overflow weir whose height in relation to the upper surface level of disengaged lighter medium determines the interface level between the liquid media under non-mixing flow conditions in the mixing chamber and hence the instantaneous volume ratio of the media in the mixing zone.

4. A method according to claim 1, in which the step of recovering disengaged lighter and heavier media comprises providing respective valves in offtake lines from the upper and lower chambers and controlling the rates of flow through the valves to correspond to the feed rates of the media to the mixing chamber thereby to maintain the instantaneous volume ratio of the liquid media in the mixing zone substantially constant.

5. Apparatus for effecting liquid-liquid contact between an aqueous liquid medium and an organic hydrophobic liquid medium, the aqueous liquid medium being capable of undergoing mass transfer with the organic hydrophobic liquid medium, which apparatus comprises:

a mixing chamber;

supply means for supplying the aqueous liquid medium and the organic hydrophobic liquid medium to the mixing chamber;

agitator means in the mixing chamber for mixing the aqueous and organic hydrophobic liquid media within a mixing one so as to form therein a dispersion of globules of one phase dispersed in the other, the globules being of a size such that the dispersion is capable of disengaging substantially completely into two separate layers upon standing under gravity; and the phase ratio of the media in the dispersion corresponding substantially to the instantaneous volume ratio of the media in the mixing zone and lying in the range of about 5:1 to 1:5;

an upper chamber disposed above the mixing chamber;

upper baffle means disposed between the mixing chamber and the upper chamber and providing a plurality of flow paths for passage of liquid between the mixing chamber and the upper chamber in operation of the apparatus, the upper baffle means further being adapted to permit maintenance in the upper chamber of settling conditions facilitating collection of, and maintenance of a layer of, disengaged lighter medium in the upper chamber, despite turbulent mixing conditions in the mixing chamber;

a lower chamber disposed below the mixing chamber;

lower baffle means disposed between the mixing chamber and the lower chamber and providing a plurality of flow paths for passage of liquid between the mixing chamber and the lower chamber in operation of the apparatus, the lower baffle means further being adapted to permit maintenance in the lower chamber of settling conditions facilitating collection of, and maintenance of a layer of, disengaged heavier medium in the lower chamber, despite turbulent mixing conditions in the mixing chamber;

means for continuously recovering disengaged lighter medium from the upper chamber at a rate corresponding substantially to the rate of supply of the lighter medium to the mixing chamber; and means for continuously recovering disengaged heavier medium from the lower chamber at a rate corresponding substantially to the rate of supply of the heavier medium to the mixing chamber, to maintain the instantaneous volume ratio of the media in the mixing zone substantially constant at a value in the range from about 5:1 to about 1:5 which is independent of the ratio of the feed rates of the media to the mixing chamber and hence to maintain the phase ratio of the dispersion in the mixing zone substantially at the value irrespective of variations in the ratio of the feed rates of the media to the mixing chamber.

6. Apparatus according to claim 5, in which the mixing chamber is circular in plan and in which the agitator means comprises an impeller mounted for rotation about the vertical axis of the mixing chamber.

7. Apparatus according to claim 5, in which the mixing chamber is square in plan and in which the agitator means comprises an impeller mounted for rotation about the vertical axis of the mixing chamber.

8. Apparatus according to claim 5, in which at least one of the upper and lower baffle means comprises an array of inclined baffle plates.

9. Apparatus according to claim 8, in which the plates are corrugated with the corrugations running substantially in the direction of maximum slope.

10. Apparatus according to claim 9, in which the peaks of the corrugations of adjacent plates lie in the same vertical plane so that the vertical distance between adjacent plates remains constant at a desired value.

11. Apparatus according to claim 8, in which opposite faces of each of the baffle plates are made of different surface energy characteristics with faces of high surface energy and low surface energy alternating in the baffle means.

12. Apparatus according to claim 5, in which at least one of the upper and lower baffle means comprises a plurality of vertical plates whose planes intersect to form an array of open-ended cells to provide the plurality of liquid flow paths.

13. Apparatus according to claim 12, in which the plates are arranged in two sets of parallel plates, with the planes of the two sets substantially at right angles one to another so as to form open-ended square section cells.

14. Apparatus according to claim 5, in which at least one of the upper and lower baffle means comprises a pad of mesh fabric.

15. Apparatus according to claim 14, in which the mesh fabric is a knitted or woven fabric.

16. Apparatus according to claim 15, in which the mesh fabric comprises a dual filament knitted mesh fabric knitted from side by side filaments of a high surface energy material and of a low surface energy material.

17. Apparatus according to claim 16, in which the mesh fabric comprises a dual filament knitted mesh fabric knitted from side by side filaments of stainless steel and polypropylene.

18. Apparatus according to claim 5 in which the means for continuously recovering disengaged lighter medium from the upper chamber comprises an overflow device whereby the upper surface level of disengaged lighter medium remains at a substantially constant height in the apparatus and in which the means for continuously recovering heavier medium from the lower chamber comprises a riser communicating with the lower chamber and a weir over which disengaged heavier medium from the riser may overflow in operation of the apparatus, the height of the weir in relation to the upper surface level of the disengaged lighter medium serving to determine the height of the interface between the media in the mixing chamber under non-mixing flow conditions and hence the instantaneous volume ratio of the media in the mixing zone in operation of the apparatus.

19. Apparatus according to claim 18, in which the height of the weir is adjustable.

20. Apparatus according to claim 5, in which the agitator means comprises an impeller and in which the supply means comprises an axial draught tube through which at least one of the media is introduced to the mixing chamber.

* * * * *